US008060487B2

(12) United States Patent
Schmidt-Karaca (10) Patent No.: US 8,060,487 B2
(45) Date of Patent: Nov. 15, 2011

(54) SEARCHING FOR AND LAUNCHING DATA FILES NOT ASSOCIATED WITH AN APPLICATION

(75) Inventor: Markus Schmidt-Karaca, Heidelberg (DE)

(73) Assignee: SAP AG, Walldorf (DE)

( * ) Notice: Subject to any disclaimer, the term of this patent is extended or adjusted under 35 U.S.C. 154(b) by 276 days.

(21) Appl. No.: 11/195,548

(22) Filed: Aug. 1, 2005

(65) Prior Publication Data

US 2007/0027866 A1 Feb. 1, 2007

(51) Int. Cl.
*G06F 7/00* (2006.01)
*G06F 17/30* (2006.01)

(52) U.S. Cl. .................. 707/706; 707/723; 707/741

(58) Field of Classification Search ............ 707/13, 707/4, 5, 102, 3, 999.003, 707, 706, 723, 707/741
See application file for complete search history.

(56) References Cited

U.S. PATENT DOCUMENTS

| 2006/0036954 A1* | 2/2006 | Satyadas et al. | 715/742 |
| 2006/0136389 A1* | 6/2006 | Cover et al. | 707/3 |

OTHER PUBLICATIONS

The Konqueror Handbook, Rewan Loisant, Pamela Roberts, Rev 3.1, 2002. Wayback Machine location: http://web.archive.org/web/20040812191823/docs.kde.org/en/3.2/kdebase/konqueror/.*

The KFind Handbook, Dirk Doefflinger, Revision 1.20.01, Apr. 2004. Wayback Machine location: http://web.archive.org/web/20070522033129/docs.kde.org/development/en/kdebase/kfind/index.html.*

KDE 2.0 architecture, the KDE Team, 2002. Wayback Machine location: http://web.archive.org/web/20020610042545/developer.kde.org/documentation/kde2arch/index.html.*

Deductus disk catalog and personal full-text search engine, 2003. Screen capture of application with highlighting in preview window. Wayback Machine location: http://web.archive.org/web/20031004180957/http://www.aolej.com/dedu/img/screen2.gif.*

"Copernic Desktop Search", 2004, available online: http://web.archive.org/web/20041229125453/http://www.copernic.com/en/products/desktop-search/features.html.*

Microsoft Product Support Services, "HOWTO: Make VC++ Recognize File Extensions as C/C++ Files", 1999, available online: https://prj.tzi.org/cgi-bin/trac.cgi/export/4810/libmbus/trunk/doc/vc_cc.html.*

* cited by examiner

*Primary Examiner* — Yicun Wu
*Assistant Examiner* — Brannon W Smith
(74) *Attorney, Agent, or Firm* — Mintz, Levin, Cohn, Ferris, Glovsky and Popeo, P.C.

(57) ABSTRACT

A technique may receive a search query including at least one search term. In response to this search query an index of a plurality of data files may be searched to identify data files containing the at least one search term. Subsequently, a list of one or more links to launch having a corresponding data file identified as containing the at least one search term is generated. In some variations, each data file corresponds to an application and has a file extension that is not associated with the application. Related techniques, apparatuses, systems, articles of manufacture are also described.

19 Claims, 5 Drawing Sheets

SEARCHING FOR AND LAUNCHING DATA FILES NOT ASSOCIATED WITH AN APPLICATION

TECHNICAL FIELD

The subject matter described herein relates to searching data files to identify one or more applications.

BACKGROUND

Computer users conduct a large number of tasks aided by applications which can be launched from their local computers. Such applications are typically installed locally and/or at a remote computer accessible via a communications network such as the Internet. As the number of applications increases, it is more difficult to locate a suitable application.

With enterprise portals in which a limited number of applications are available to users, available applications may be identified through a series of hierarchical and logical menus. Such an arrangement is often cumbersome to utilize and provides little, if any, information regarding each application other than its name. Moreover, significant administrative effort may be required to generate and maintain hierarchical and logical menus identifying available applications.

SUMMARY

In one aspect, a search query may be received that includes at least one search term (e.g., a key word). Based on this query, an index of a plurality of data files (residing locally and/or distributed over a communications network) may be searched to identify data files containing the at least one search term. In some variations, each data file corresponds to an application and has a file extension that is not associated with the application (i.e., launching the data file will not cause the associated application to also launch). Based on the search of the index, a list of one or more links to launch applications having a corresponding data file identified as containing the at least one search term may be generated.

In some variations, the list of links may be presented to a user along with a textual preview for each link of the data file based on at least one portion of the data file containing the at least one search term. Optionally, the search terms within the textual preview may be displayed in a different format than the other portions of the textual preview. For example, the search terms may be highlighted, emboldened, underlined, and the like. In addition or in the alternative, each link in the list may also be accompanied by a textual description of the associated application in order to facilitate an informed selection by a user.

Prior to the generation of the list of links to applications, an application corresponding to each data file identified as containing the at least one search term may be identified. In addition, prior to the generation of the list of links to applications, it may be determined whether an entity originating the search query is authorized to access each identified application. In some variations, the authorization/permission is determined by accessing an access control list to determine whether the entity has been granted permission to access each identified application.

In response to the presentation of the list of links, a selection of one of the links by the user may be received. This selection will initiate the launch of the application associated with the link which may be facilitated by an application launcher.

The portions of the data files that are searched may also include text to be displayed in a graphical user interface element containing the at least one search term. Additional information such as the name of the application may also be searched. Moreover, in addition to data files distributed over a computer network, a plurality of local data files may be searched for local data files containing the at least one search term. In some variations, each local data file may correspond to an application and have a file extension that is not associated with the application.

The data files may be associated with an application in a variety of ways. An association may be based on a physical/logical organization of the date files. For example, each data file residing within a certain folder may be associated with a single application. In addition, the contents of the data files may be examined in order to determine whether the name of an application is identified or another identifier associated with the application is present within the data file.

The index may be generated by mapping each application to a plurality of key words found in data files corresponding to the application. From this mapping, an entry in the index may be generated. The index may also be generated with additional information such as links to launch the application, textual previews of the data files, descriptions of the applications, etc.

In an interrelated aspect, a search query may be received that includes at least one search term. Thereafter, an index of a plurality of data files may be searched to identify a data file having text to be displayed within a graphical user interface element (or otherwise by an application) containing the at least one search term. A list of one or more links to launch applications may subsequently be generated having a data file corresponding to the application and being identified as containing text to be displayed within a graphical user interface element containing the at least one search term.

In a further aspect, an apparatus may comprise a receiver, a search unit, and a results unit. The receiver may be operable to receive a search query including at least one search term. The search unit may be operable to search an index of a plurality of data files to identify data files containing the at least one search term. In some variations, each data file may correspond to an application and have a file extension that is not associated with the application. The results unit may be operable to generate a list of one or more links to launch applications having a corresponding data file identified as containing the at least one search term.

In another interrelated aspect, an apparatus may comprise a receiver, a search unit, and a results units. The receiver may be operable to receive a search query including at least one search term. The search unit may be operable to search an index of a plurality of data files (locally and/or distributed over a communications network) to identify data files each corresponding to an application that has text to be displayed within a graphical user interface element containing the at least one search term. The results units may be operable to generate a list of one or more links to launch applications having a corresponding data file identified as containing text to be displayed within a graphical user interface element containing the at least one search term.

In still a further interrelated aspect, a search query from a user may be received that includes at least one search term. Thereafter, an index of a plurality of data files, such as applications, web pages, text repositories, source code repositories, and the like, may be searched to identify data files containing the at least one term. Subsequently, an access control list may be accessed in order to determine whether the user has permission to access at least a portion of the identified data files. A list of identified data files for which the user has permission to access may then be generated.

Articles of manufacture, tangibly embodied on a machine-readable medium, are also described. Such articles of manufacture may include executable instructions that cause a machine to conduct one or more of the method acts described herein.

Similarly, systems are also described that may include a processor and a memory coupled to the processor. The memory may encode one or more programs that cause the processor to perform one or more of the method acts described herein.

The subject matter described herein provides many advantages. Rather than providing hierarchical and logical menus for identifying available applications, the current subject matter enables key word searching of applications. Such key word searching provides a thorough listing of matching applications (having associated data files with one or more of the key words) which does not require updating by an administrator. Moreover, the use of a search engine mechanism consumes less graphical user interface space as compared to a set of menus (e.g., drop down menus, etc.).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
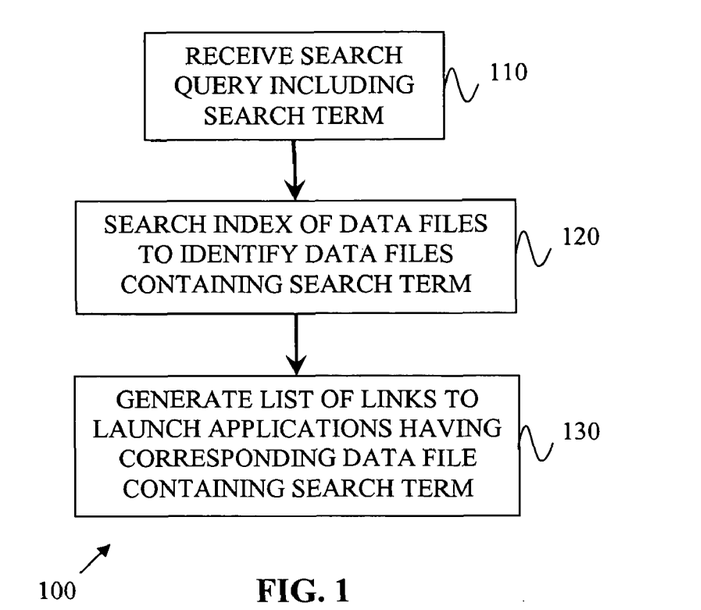
FIG. 1 is a first process flow diagram illustrating a method to generate a list of links to one or more application in response to a search query.

FIG. 1 is a process flow diagram that illustrates a method 100, which at 110, receives a search query including at least one search term. An index of a plurality of data files (which may be distributed over a communications network such as packet-switched network and/or which may reside locally), is searched at 120, to identify data files containing the at least one search term. Each data file corresponds to an application and has a file extension that is not associated with the application (e.g., a data file having an extension of .txt which operates only to launch a word processing application). At 130, a list of one or more links to launch applications having a corresponding data file identified as containing the at least one search term is generated.

Figure 2:
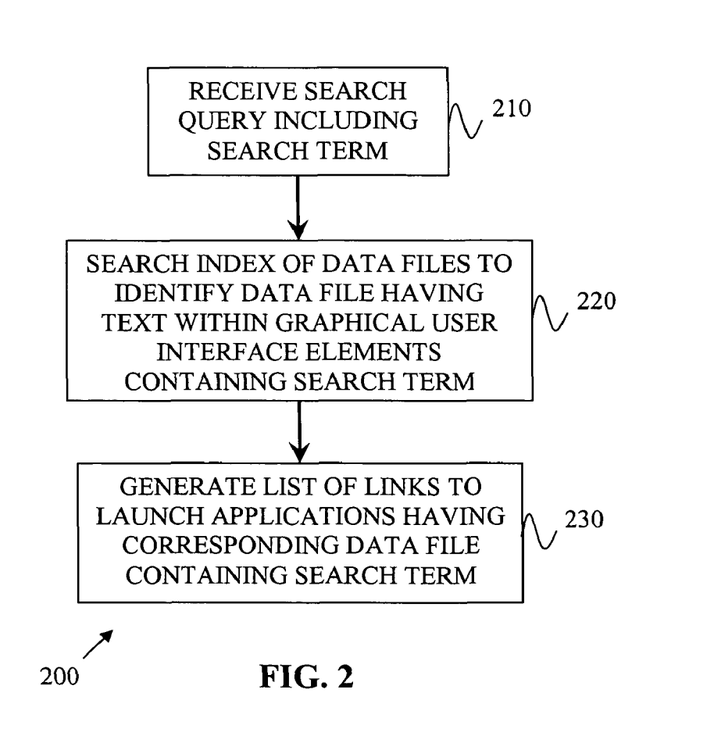
FIG. 2 is a second process flow diagram illustrating a method interrelated to the method of FIG. 1 to generate a list of links to one or more application in response to a search query.

FIG. 2 illustrates a method 200 interrelated to the method 100 of FIG. 1 in which, at 210, a search query is received that includes at least one search term. Subsequently, at 220, an index of a plurality of data files each corresponding to an application is searched to identify data files having text to be displayed within a graphical user interface element (and/or text that would be displayed by an application) containing the at least one search term. A list of one or more links to launch applications having a corresponding data file identified as containing text to be displayed within a graphical user interface element containing the at least one search term may be generated at 230.

Figure 3:
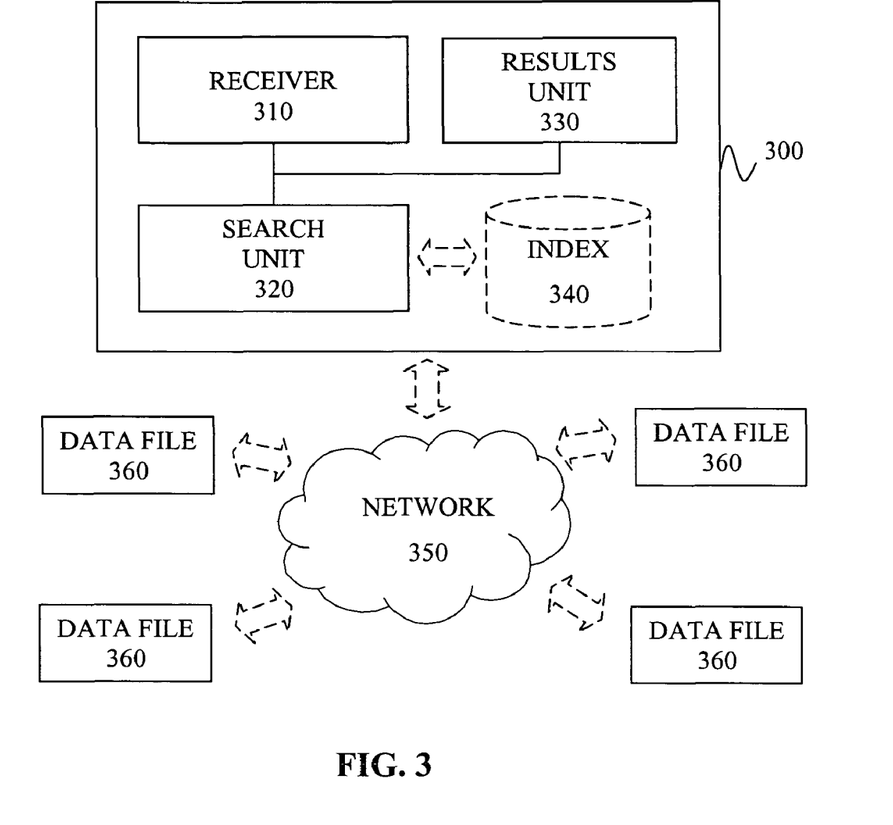
FIG. 3 is a schematic diagram of an apparatus to generate a list of links to one or more application in response to a search query.

FIG. 3 illustrates an apparatus 300 comprising a receiver 310, a search unit 320, and a results unit 330. The receiver 310 is operable to a receive a search query including at least one search term. The search query may originate locally or it may originate remote (e.g., via a communications network). The search unit 320 is operable to search an index of a plurality of data files to identify data files containing the at least one search term. With this variation, each data file corresponds to an application and has a file extension that is not associated with the application. The results unit 330 is operable to generate a list of one or more links to launch applications having a corresponding data file identified as containing the at least one search term. Optionally, the apparatus 300 may include or be coupled to an index 340 which may take the form of a data repository. Additionally, the apparatus 300 may optionally be coupled to or otherwise access a plurality of data files 360 via a network 350.

In another interrelated variation, the search unit 320 may additionally or alternatively be operable to search the index 340 of a plurality of data files to identify data files each corresponding to an application that has text to be displayed within a graphical user interface element containing the at least one search term. In addition, the results unit 330 may additionally or alternatively be operable to generate a list of one or more links to launch applications having a corresponding data file identified as containing text to be displayed within a graphical user interface element containing the at least one search term.

The following provides information useful for understanding and implementing the subject matter described herein as well as optional variations that may be implemented singly or in combination depending on the desired configuration.

The generated list of applications may sort the applications based on criteria such as a number of times the application is accessed (whether by the user or enterprise-wide), alphabetical order of the name of the applications, and the like. In some variations, a first order criterion sorts the list of applications based on user statistics to achieve a maximum relevance of results. Secondarily, enterprise wide usage statistics may be used to rank the list of applications in the absence of user statistics. Moreover, with such variations, a data repository may store the number of times that each application is accessed by a user and/or across an enterprise.

In addition, the generated list may also include a preview of the passage/section of the data files in which the key words were located. In some variations, the key words are displayed in a different visual format such as by highlighting, bold text, underlining, and the like. A link may be provided for each application which causes the application (rather than the associated data file) to be launched when the link is activated.

The index 340 may optionally also include or be coupled to an access control list (ACL). Prior to displaying a list of applications in response to a search query (and/or prior to launching an application), the ACL may be accessed to determine whether a user has been authenticated and has an entry in the ACL providing authorization to access the application. Applications for which a user does not have authorization to access may be omitted from a displayed list of applications with links and/or an application launcher may prevent a selected application from being launched.

Figure 4:
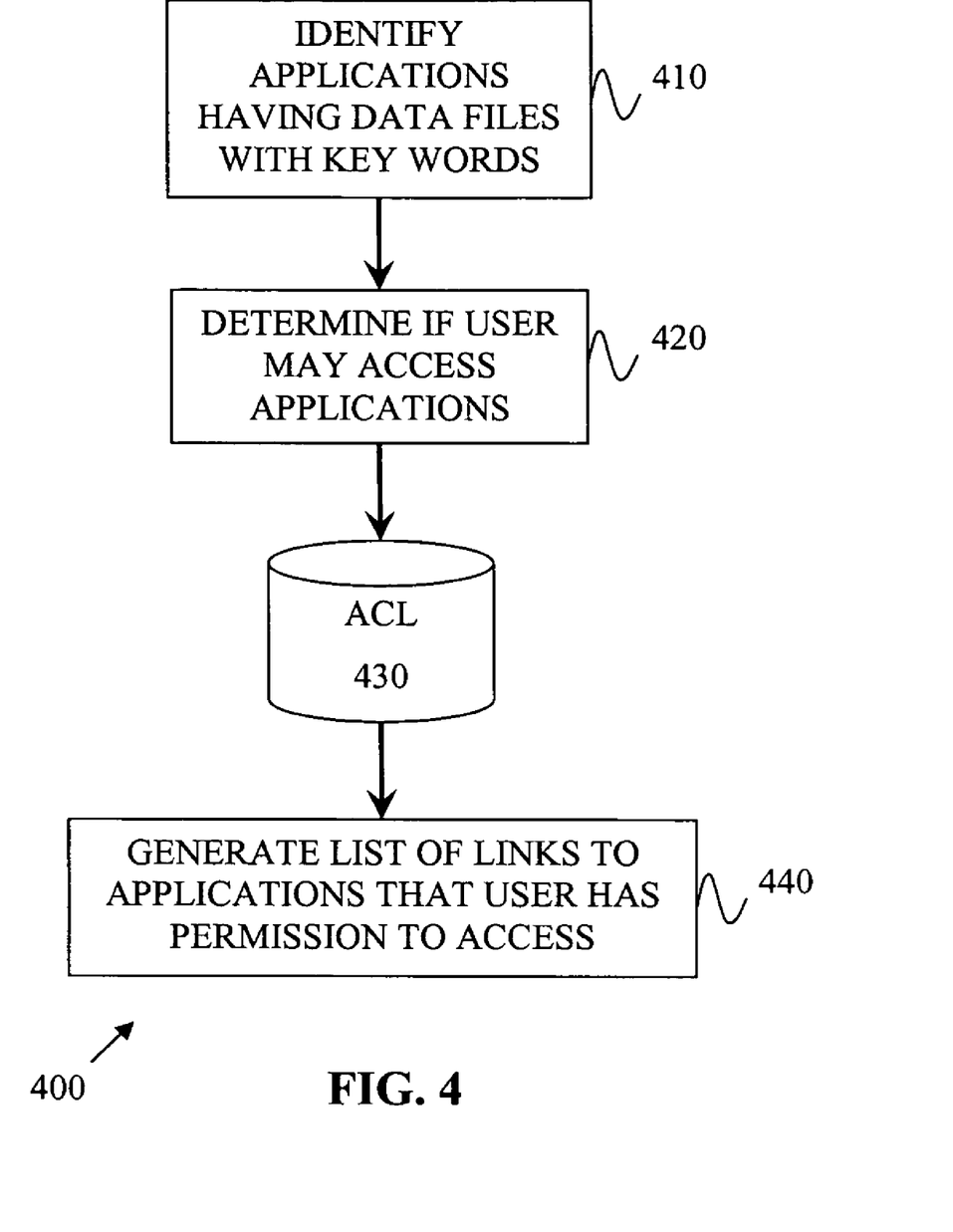
FIG. 4 is a process flow diagram of a method for creating an index useful for understanding and implementing the subject matter described herein.

FIG. 4 illustrates a first method 400 useful for understanding and implementing the subject matter herein in which an access control list 430 is utilized to selectively provide access to applications. With this variation, at 410, applications having data files with key words contained within a search query are identified. After the applications have been identified, at 420, it is determined whether a user may access the applications by polling the access control list 430 (which may form or be maintained in a data repository). Subsequently, a list of links to applications that the user has permission to access may be generated. If the user may only access a portion of applications identified at 410, then the list of links only contains a sub-set of available applications.

Figure 5:
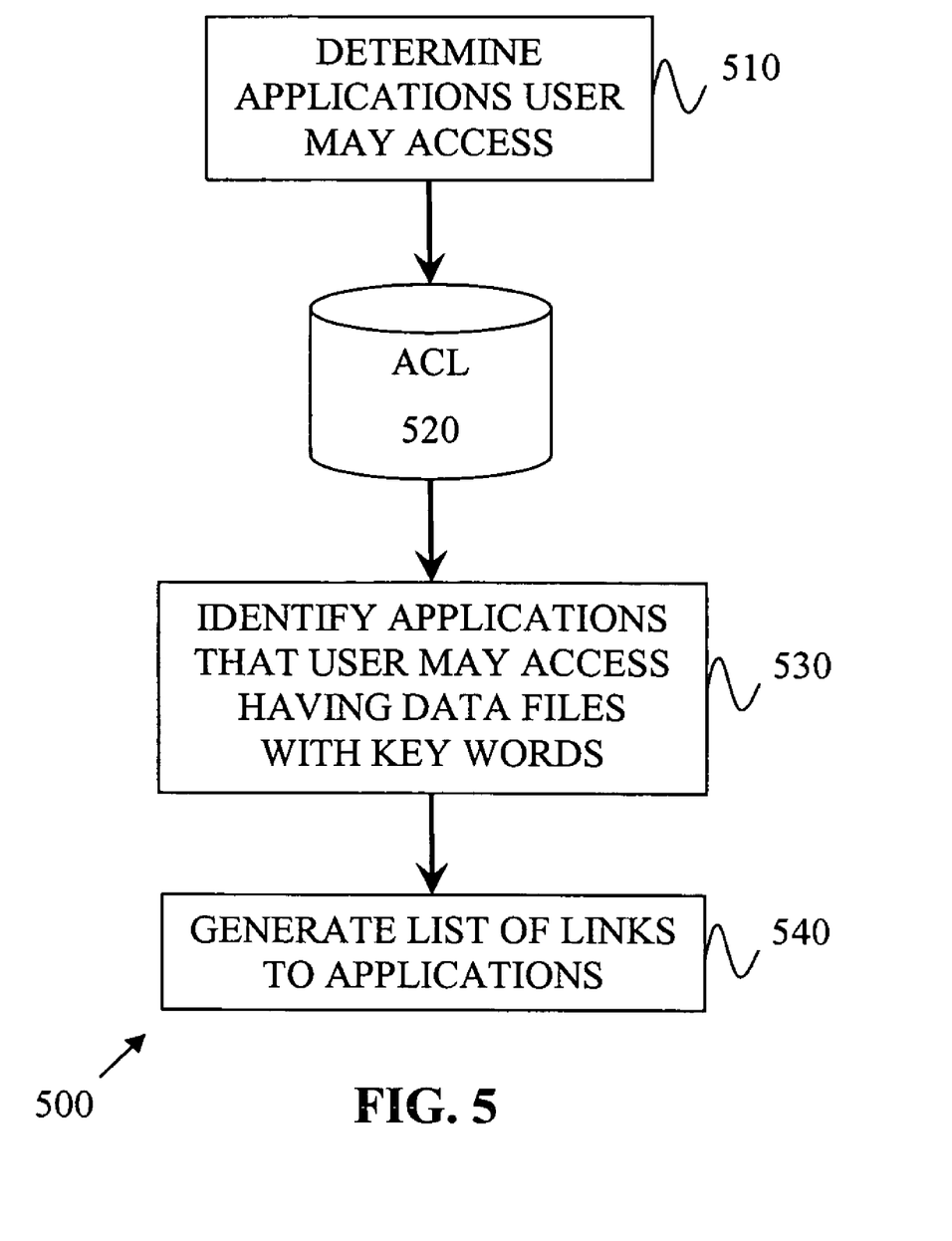
FIG. 5 is a process flow diagram of a first method for generating a list of application links using an access control list for understanding and implementing the subject matter described herein.

FIG. 5 illustrates a second method 500 useful for understanding and implementing the subject matter herein in which an access control list 520 is used to selectively provide access to applications. At 510, a determination is made as to which applications a user may access by polling the access control list 520. Thereafter, only those applications that a user may access are searched to, at 530 identify application having data files with key words. Thereafter, at 540, a list of links to applications that the user has permission to access may be generated. As compared to the method 400 of FIG. 4, this method 500 first determines which applications a user may access prior to searching data files for key words.

Figure 6:
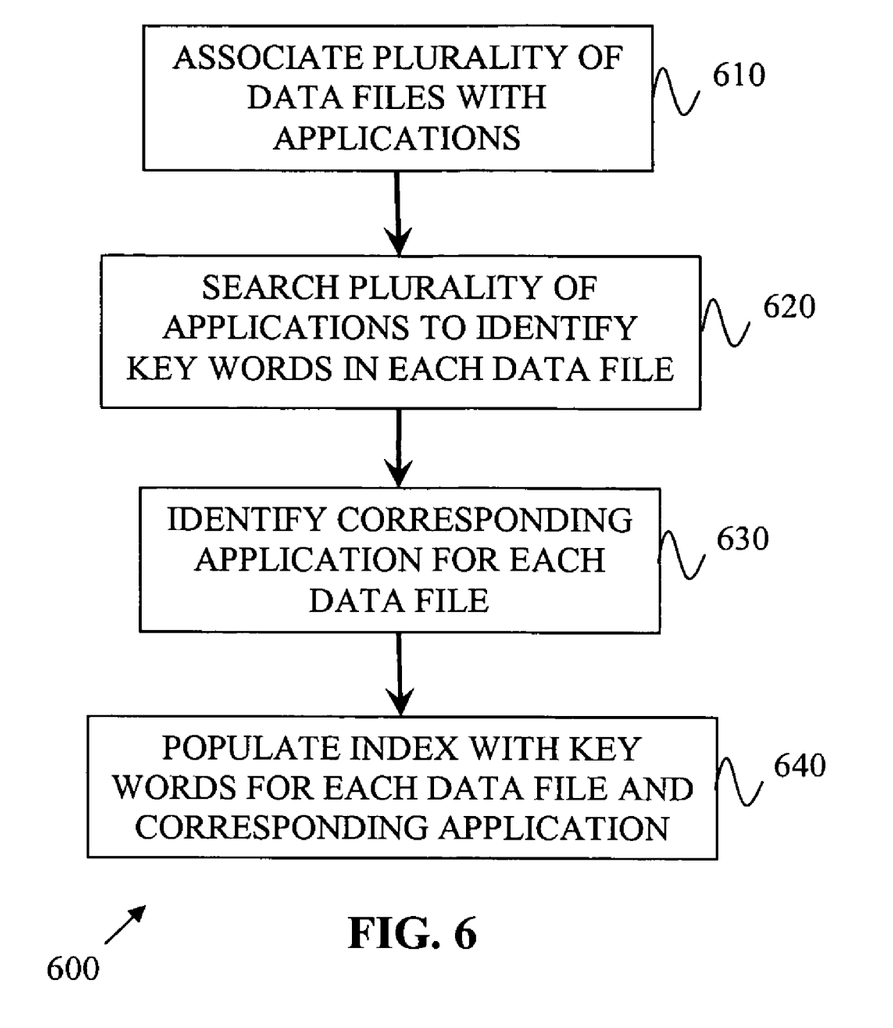
FIG. 6 is a process flow diagram of a second method for generating a list of application links using an access control list for understanding and implementing the subject matter described herein.

FIG. 6 is a process flow diagram illustrating a method 600 of generating an index useful for understanding and implementing the subject matter described herein. At 610, a plurality of data files may be associated with applications. These data files may comprise any sort of data file that is associated with an application (e.g., documentation, graphics files, tutorials, etc.). The data files may be locally available and/or they may be distributed across a plurality of nodes coupled to a communications network (e.g., the Internet).

For applications configured as a single executable, information that is to be displayed cannot be easily accessed (e.g., text within graphical user interface elements, etc.). However, associated documentation may be available. In addition, for applications in which data files containing text to be displayed are stored in known locations (e.g., html pages of a web-based application), such data files may be associated with the application. In some variations, a text repository separate from the application source code that is accessible for translation purposes may be searched for key words. In addition, source code repositories may also be searched. As used herein, the term "data file" also includes such text repositories and source code repositories.

In some variations, the plurality of data files is derived from a defined list of applications. For example, an administrator of an application portal may define a superset of applications for which a search engine may be used to search key words in the related data files. The superset of applications may be valid for all users with a certain access level. With such an arrangement, the search path conducted by a software agent (e.g., crawler) may be specified by a classification of the applications. This classification may include directories with application related data files, application related directories (e.g., all data files within a certain folder are associated with a single application), or documentation directories of source code or text repositories. In addition or in the alternative, the association may be server based such that certain data files available on a certain server are associated with an application (e.g., application executable on server 1, text repository on server 2, documentation on server 3, etc.).

The association with the applications may be also be determined based on the key word/content found within the data files. In some variations, key words found within a data file that match a name of an application and/or a description of the application, are used to associate the data file and application.

At 620, each data file may be searched to identify one or more key words that might be utilized within a search engine query. Such searching may be performed by an automated software agent such as a spider, crawler, robot, bot, and the like. The software agents may access each of the plurality of data files and examine information within such data files to identify key words within the data files. This information may comprise any and all portions of a data file, including without limitation, text to be displayed within graphical user interface elements or otherwise in an application when the application has been launched and is operating. Additional information such as visible text on a web page, hyperlinks, content of various tags in the data file (title tag, meta tags, Dublin Core Tags, comments tags, alt tags, attribute tags, content, etc.) may also be searched for key words.

After the key words within the data files have been identified, at 630, the corresponding applications for the data files are identified. Subsequently, at 640, the index may be populated with key words and complementary information such as the name of and a link to launch the associated application, a description of the application, a preview of the content within the data file containing the key word, and the like. Entries for each data file may be periodically updated each time a software agent polls or otherwise examines the contents of the data file. The index may thereafter be used to provide search results in response to queries containing at least one search term.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, access control lists as described herein may alternatively be coupled to any search engine index in order to selectively provide users with access to applications, documents (e.g., web pages, etc.), and other files based on a permission level associated with the user. Other embodiments may be within the scope of the following claims.

What is claimed is:

1. A computer-implemented method comprising:
   associating a plurality of data files each with one of a plurality of applications, the associating comprising identifying, for each application of the plurality of applications, one or more of the plurality of data files that corresponds to the application, the data files comprising application source code which when compiled or translated becomes an executable application program component of the application, an application text file repository available to the application for translation purposes, an application graphics file that includes text associated with one or more of screens and buttons for display within the application, and tutorial for the application;
   searching the plurality of data files to identify one or more key words using an automated software agent;
   populating an index with the one or more key words and complementary information to the one or more key words, the complementary information including one or more associated applications of the plurality of applications and a link to launch the one or more associated applications, a description of the one or more applications, and a preview of one or more data files of the plurality of data files that contains the key word;
   receiving an application search query including one or more search terms;
   searching the index to identify data files containing the one or more search terms;
   generating a list of links to launch applications associated with the data files containing the one or more search terms; and
   sorting the list of links based on usage statistics including the frequency of link usage by a user or enterprise-wide.

2. A method as in claim 1, further comprising:
   generating, for each link in the list, a textual preview of the data file based on at least one portion of the data file containing the at least one search term.

3. A method as in claim 2, wherein the textual preview of the data file displays the at least one search term in a visual format different from a remainder of the at least one portion of the data file.

4. A method as in claim 1, further comprising:
   generating, for each link in the list, a textual description of each application.

5. A method as in claim 1, further comprising:
   determining whether an entity originating the search query is authorized to access each identified application.

6. A method as in claim 5, wherein the determining whether the entity originating the search query is authorized to access each identified application comprises:
   accessing an access control list to determine whether the entity has been granted permission to access each identified application.

7. A method as in claim 1, further comprising:
   receiving a selection of one of the links; and
   initiating the launch of an application associated with the link.

8. A method as in claim 1, further comprising:
   searching the plurality of data files to identify text to be displayed in a graphical user interface element containing the at least one search term.

9. A method as in claim 1, further comprising:
   searching a plurality of local data files on a local client to identify local data files containing the at least one search term, wherein each local data file corresponds to an application and has a file extension that is not associated with the application.

10. A method as in claim 1, wherein the searching a plurality of data files further comprises:
    searching each of the plurality of data files to identify text within a name of the data files containing the at least one search term.

11. A method as in claim 1, wherein the associating a plurality of data files with an application comprises:
    mapping an application to a plurality of key words found in data files corresponding to the application; and
    generating an entry in a search index entry based on the mapping.

12. A method as in claim 1, wherein the associating the plurality of data files with one of a plurality of applications an application comprises:
    associating a data file folder with an application; and
    identifying all data files within the folder as corresponding to the application; and
    searching the plurality of data files to identify data files containing an identifier associated with the application.

13. A computer-implemented method as in claim 1, wherein the automated software agent includes one or more of a spider, a crawler, a robot, and a bot.

14. A computer-implemented method as in claim 1, wherein the plurality of data files further comprises application documentation files.

15. A computer-implemented method as in claim 1, wherein the automated software agent includes one or more of a spider, a crawler, a robot, and a bot.

16. A computer readable storage medium containing executable instructions that, when executed by at least one processor, cause the at least one processor to perform operations comprising:
- associating a plurality of data files each with one of a plurality of applications, the associating comprising identifying, for each application of the plurality of applications, one or more of the plurality of data files that corresponds to the application, the data files comprising application source code which when compiled or translated becomes an executable application program component of the application, an application text file repository available to the application for translation purposes, an application graphics file that includes text associated with one or more of screens and buttons for display within the application, and tutorial for the application;
- searching the plurality of data files to identify one or more key words using an automated software agent;
- populating an index with the one or more key words and complementary information to the one or more key words, the complementary information including one or more associated applications of the plurality of applications and a link to launch the one or more associated applications, a description of the one or more applications, and a preview of one or more data files of the plurality of data files that contains the key word;
- receiving an application search query including one or more search terms;
- searching the index to identify data files containing the one or more search terms;
- generating a list of links to launch applications associated with the data files containing the one or more search terms; and
- sorting the list of links based on usage statistics including the frequency of link usage by a user or enterprise-wide.

17. A computer readable storage medium as in claim 16, wherein the automated software agent includes one or more of a spider, a crawler, a robot, and a bot.

18. A computer readable storage medium as in claim 16, wherein the plurality of data files further comprises application documentation files.

19. A system comprising:
at least one processor; and
at least one computer readable storage medium containing executable instructions that, when executed by the at least one processor, cause the at least one processor to perform operations comprising:
- associating a plurality of data files each with one of a plurality of applications, the associating comprising identifying, for each application of the plurality of applications, one or more of the plurality of data files that corresponds to the application, the data files comprising application source code which when compiled or translated becomes an executable application program component of the application, an application text file repository available to the application for translation purposes, an application graphics file that includes text associated with one or more of screens and buttons for display within the application, and tutorial for the application;
- searching the plurality of data files to identify one or more key words using an automated software agent;
- populating an index with the one or more key words and complementary information to the one or more key words, the complementary information including one or more associated applications of the plurality of applications and a link to launch the one or more associated applications, a description of the one or more applications, and a preview of one or more data files of the plurality of data files that contains the key word;
- receiving an application search query including one or more search terms;
- searching the index to identify data files containing the one or more search terms;
- generating a list of links to launch applications associated with the data files containing the one or more search terms; and
- sorting the list of links based on usage statistics including the frequency of link usage by a user or enterprise-wide.

* * * * *